United States Patent [19]

Welk

[11] Patent Number: 4,664,616

[45] Date of Patent: May 12, 1987

[54] SINGLE-PASS TILE DOMER

[75] Inventor: Kenneth L. Welk, Conestoga, Pa.

[73] Assignee: Armstrong World Industries, Inc., Lancaster, Pa.

[21] Appl. No.: 866,725

[22] Filed: May 27, 1986

[51] Int. Cl.$^4$ .............................................. B29C 53/04
[52] U.S. Cl. .................................... 425/373; 264/339
[58] Field of Search ................ 425/373, 366; 264/339, 264/295, 285

[56] References Cited

U.S. PATENT DOCUMENTS

| | | | |
|---|---|---|---|
| 2,055,205 | 9/1936 | Pereyra | 425/363 |
| 2,290,102 | 7/1942 | Hamilton | 264/339 |
| 2,732,591 | 1/1956 | Whittum | 425/363 |
| 2,822,575 | 2/1958 | Imbert et al. | 425/363 |
| 2,897,546 | 8/1959 | Clapp et al. | 264/339 |
| 3,253,072 | 5/1966 | Scragg et al. | 264/DIG. 47 |
| 3,517,098 | 6/1970 | Rasmussen | 264/292 |
| 3,525,787 | 8/1970 | McDermott | 264/285 |
| 3,553,300 | 1/1971 | Buff | 425/371 |
| 4,161,383 | 7/1979 | Gadani | 425/363 |
| 4,285,653 | 8/1981 | Bronnec | 425/363 |

FOREIGN PATENT DOCUMENTS

| | | | |
|---|---|---|---|
| 1458974 | 10/1966 | France | 425/373 |
| 2051885 | 9/1971 | France | 264/285 |

Primary Examiner—Tim Miles

[57] ABSTRACT

An apparatus for providing a square tile with a domed configuration. The tile passes over a bowed roller which presses upon the center region of the tile while restraining belts hold the four corners of the tile in a depressed condition and the apparatus imparts a domed configuration to the tile.

1 Claim, 2 Drawing Figures

SINGLE-PASS TILE DOMER

BACKGROUND OF THE INVENTION

1. Field of the Invention

The invention is directed to the manufacturer of a floor tile, and, particularly, to the shaping of the floor tile in a domed configuration.

2. Description of the Prior Art

U.S. Pat. Nos. 2,055,205, 2,732,591, 2,822,575, and 3,553,300 are typical of the prior art wherein a bowed roller is used and belts pass over the bowed rollers. However, it is noted that the prior art is primarily used to have the bowed rollers impart a curvature to a sheet material and the belts used therewith are normally simply conveying belts.

SUMMARY OF THE INVENTION

An apparatus for providing a square stone/binder tile of set size with a bowed configuration. A bowed roller consisting of an inner stationary axle and an outer sleeve which rotates freely about the axis is used to convey the tile. The outer sleeve can be driven by a motor drive. The axis is bowed in a convex arc with said axle being completely within a vertical plane with the center of the convex arc being positioned above the two ends of the arc. A set of flat endless belts having upper and lower runs and positioned in two parallel planes are positioned apart slightly less than the size of the square tile. The parallel planes are perpendicular to the plane of the axis of the roller and the parallel planes are positioned an equal distance on either side of the center of the convex arc. The flat endless belts pass around two pulleys per belt with one pulley of each belt being positioned on one side of the roller and the other pulley of each belt being positioned on the other side of the roller. The pulleys for each belt are positioned with the lower edge of each pulley being in a straight line engaging the top edge of the roller or below the raised center thereof or there below, so that the lower run of each belt will force two opposite edges of the square tile below the position of the center of the tile engaging the center of the convex arc of the roller whereby the tile is forced into a domed shape with a raised center and four depressed corners.

DESCRIPTION OF THE PREFERRED EMBODIMENT

During the manufacture of a stone/binder tile wherein stone particles are held together in a tile configuration with a conventional binder, it is possible that the tile will have stresses therein which will tend to cause the tile to have raised corners when the tile is sitting flat on the floor. This is called a "curled tile" and the raised corner effect is undesirable. The best way to overcome this problem is to make the tile with a domed configuration wherein the corners are depressed and then press the tile into the adhesive there below to bond the tile to the underlying floor with the stresses causing a domed configuration in the tile prior to installation. The stresses will tend to keep the corners down when the tile is glued in position.

Figure 1:
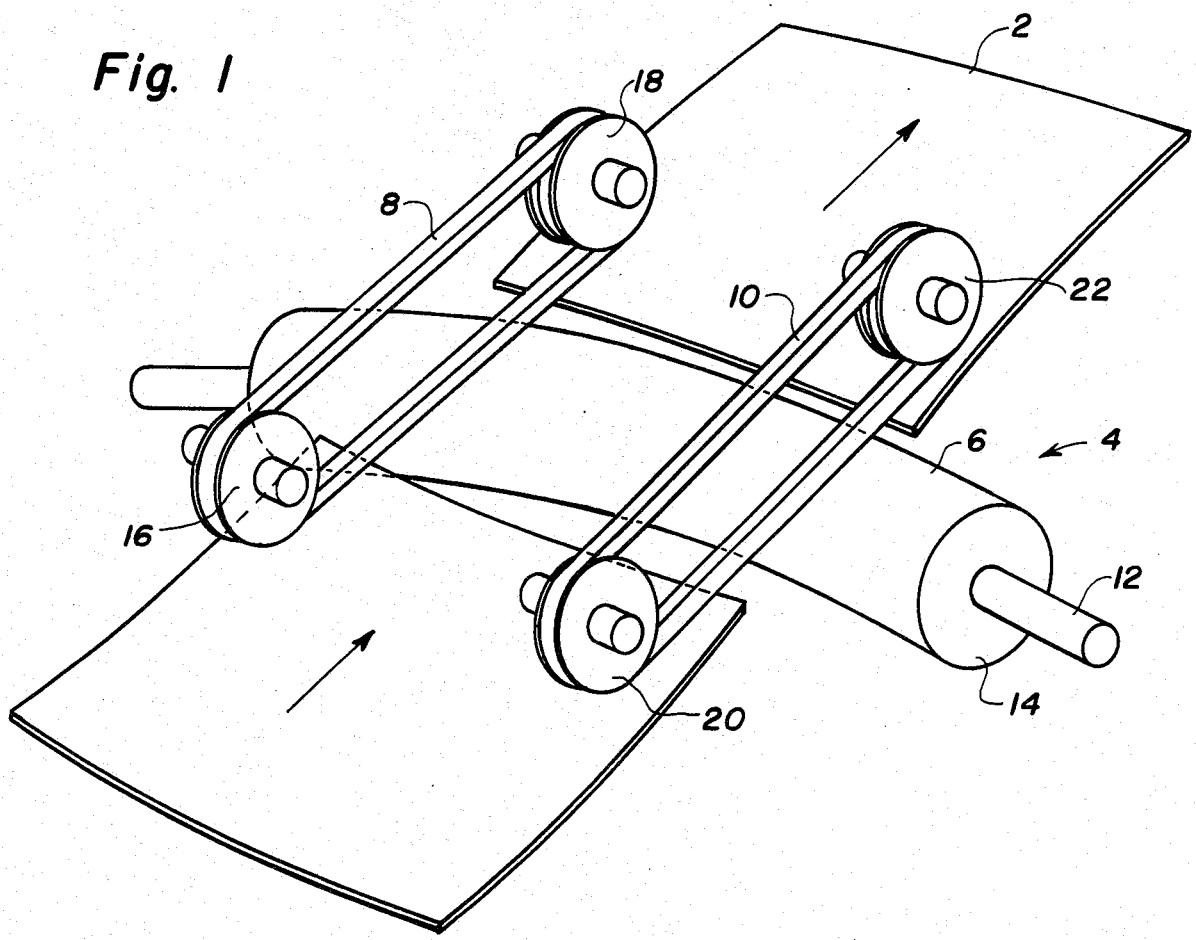
FIG. 1 is a perspective of the invention herein.
Figure 2:
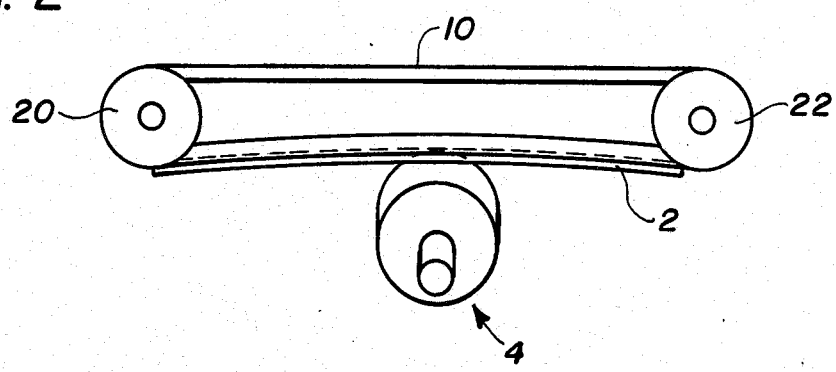
FIG. 2 is a side view of the invention herein.

The invention herein is an apparatus for providing a square stone/binder tile 2 of a set size, normally 12"×12" or 9"×9", with a domed configuration as shown in both FIG. 1 and FIG. 2 wherein there is a raised center region and the four corners are depressed. The apparatus used to provide the tile with a domed configuration is structure 4 of FIG. 1 and it is composed of a bowed roller 6 and two flat belts 8 and 10. The bowed roller 6 consists of an inner stationary axle 12 and an outer sleeve 14 which rotates freely or is driven about the axle. The axle is bowed in a convex arc as shown in FIG. 1 with said axle being completely within a vertical plane with the center of the convex arc being positioned above the two ends of the arc. This can best be seen in FIG. 1 wherein the bowed configuration is shown and in FIG. 2 it can be seen that the raised area of the bow is in a vertical plane. A set of flat endless belts 8 and 10 having upper and lower runs are positioned in two parallel planes. The planes are positioned apart slightly less than the size of the square tile so that the belts will engage the two opposite sides of the square tile. The parallel planes are perpendicular to the plane of the axis of the roller and the parallel planes are positioned an equal distance on either side of the center of the convex arc. Consequently, the center of the bowed roller is pressing against the center of the tile. The flat endless belts pass around two pulleys per belt with one pulley of each belt being positioned on one side of the roller and the other pulley of each belt being positioned on the other side of the roller. The pulleys for each belt are positioned with the lower edge of each pulley being in a straight line engaging the top edge of the roller below the raised center thereof or there below so that the lower run of each belt will force two opposite edges of the square tile below the position of the center of the tile engaging the center of the convex arc of the roller whereby the tile is forced into a dome shape with a raised center and four depressed corners.

FIG. 2 shows the lower run of the belt forcing the tile corners down while the roller raises the center of the tile.

What is claimed is:

1. An apparatus for providing a square stone/ binder tile of set size with a domed configuration comprising:
   (a) a bowed roller consisting of an inner stationary axle and an outer sleeve which rotates freely about the axis, said axle being bowed in a convex arc with said axle being completely within a vertical plane with the center of the convex arc being positioned above the two ends of the arc;
   (b) a set of flat endless belts having upper and lower runs and positioned in two parallel planes positioned apart slightly less than the size of the square tile, said parallel planes being perpendicular to the plane of the axis of said roller, and, said parallel planes being positioned an equal distance on each side of the center of the convex arc;
   (c) said flat endless belts passing around two pulleys per belt with one pulley of each belt being positioned on one side of the roller and the other pulley of each belt being positioned on the other side of the roller; and
   (d) said pulleys for each belt being positioned with the lower edge of each pulley being in a straight line engaging the top edge of the roller below the raised center thereof, or there below, so that the lower run of each belt will force two opposite edges of the square tile below the position of the center of the tile engaging the center of the convex arc of the roller whereby the tile is forced into a domed shaped with a raised center and four depressed corners.

* * * * *